United States Patent [19]
Willett et al.

[11] Patent Number: 5,870,930
[45] Date of Patent: Feb. 16, 1999

[54] STEERING COLUMN ASSEMBLY

[75] Inventors: Mark A. Willett, Midland; David W. Shaw, Saginaw, both of Mich.

[73] Assignee: Means Industries, Saginaw, Mich.

[21] Appl. No.: 707,152

[22] Filed: Sep. 3, 1996

[51] Int. Cl.$^6$ .................................................. B62D 1/18
[52] U.S. Cl. ........................... 74/492; 188/374; 280/777
[58] Field of Search ..................... 74/492, 493; 280/775, 280/777; 188/266, 374, 376; 267/64.13

[56] References Cited

U.S. PATENT DOCUMENTS

| | | | |
|---|---|---|---|
| 3,483,768 | 12/1969 | Glass | 74/492 |
| 3,656,366 | 4/1972 | Somero | 74/492 |
| 3,744,338 | 7/1973 | Komatsu et al. | 74/492 |
| 4,019,403 | 4/1977 | Kondo et al. | 74/492 |
| 4,183,258 | 1/1980 | Stephan | 74/492 |
| 4,255,986 | 3/1981 | Mukoyama | 74/492 |
| 4,273,005 | 6/1981 | Strutt | 74/492 |
| 4,274,299 | 6/1981 | Jones | 74/492 |
| 4,317,387 | 3/1982 | Myers et al. | 74/493 |
| 4,411,167 | 10/1983 | Mohr | 74/492 |
| 4,445,708 | 5/1984 | Oakes et al. | 74/492 X |
| 4,452,096 | 6/1984 | Workman | 74/492 |
| 4,627,306 | 12/1986 | Berenjian | 74/492 |
| 4,643,448 | 2/1987 | Loren | 280/777 |
| 4,674,354 | 6/1987 | Brand | 74/492 |
| 4,718,296 | 1/1988 | Hyodo | 74/492 |
| 4,733,575 | 3/1988 | Nakamura | 74/493 |
| 4,805,478 | 2/1989 | Beauch | 74/492 |
| 4,838,576 | 6/1989 | Hamasaki et al. | 280/777 |
| 4,862,761 | 9/1989 | Sander et al. | 74/492 |
| 4,867,003 | 9/1989 | Beauch et al. | 74/492 |
| 4,886,295 | 12/1989 | Browne | 280/777 |
| 4,890,505 | 1/1990 | Kinoshita et al. | 74/493 |
| 4,895,390 | 1/1990 | Fujikawa et al. | 280/777 |
| 4,901,592 | 2/1990 | Ito et al. | 74/492 |
| 4,949,992 | 8/1990 | Abramczyk | 280/777 |
| 4,995,486 | 2/1991 | Garneweidner | 74/492 X |
| 5,115,691 | 5/1992 | Beauch | 74/493 |
| 5,226,853 | 7/1993 | Courgeon | 74/493 X |
| 5,228,720 | 7/1993 | Sato et al. | 74/492 X |
| 5,235,734 | 8/1993 | DuRocher et al. | 74/492 X |
| 5,320,384 | 6/1994 | Arnold et al. | 280/777 |
| 5,342,091 | 8/1994 | Hancock | 280/777 |
| 5,368,330 | 11/1994 | Arnold et al. | 280/777 |
| 5,378,021 | 1/1995 | Yamaguchi et al. | 280/777 |
| 5,391,113 | 2/1995 | Tanaka | 74/492 X |
| 5,425,553 | 6/1995 | Yazane et al. | 74/492 X |

*Primary Examiner*—Allan D. Herrmann
*Attorney, Agent, or Firm*—Brooks & Kushman

[57] ABSTRACT

A steering column assembly. The steering column assembly comprises an upper column member and a lower column member mounted to the upper column member such that the upper column member can move relative to the lower column member. A shock absorption assembly is interconnected between the upper column member and lower column member. The shock absorption assembly includes a piston member and a piston receiver, the piston receiver including absorbing material which, upon impact to the upper column member, is compressed by the piston member within the piston receiver and extruded from the piston receiver so as to absorb impact energy as the upper column member moves relative to the lower column member.

21 Claims, 4 Drawing Sheets

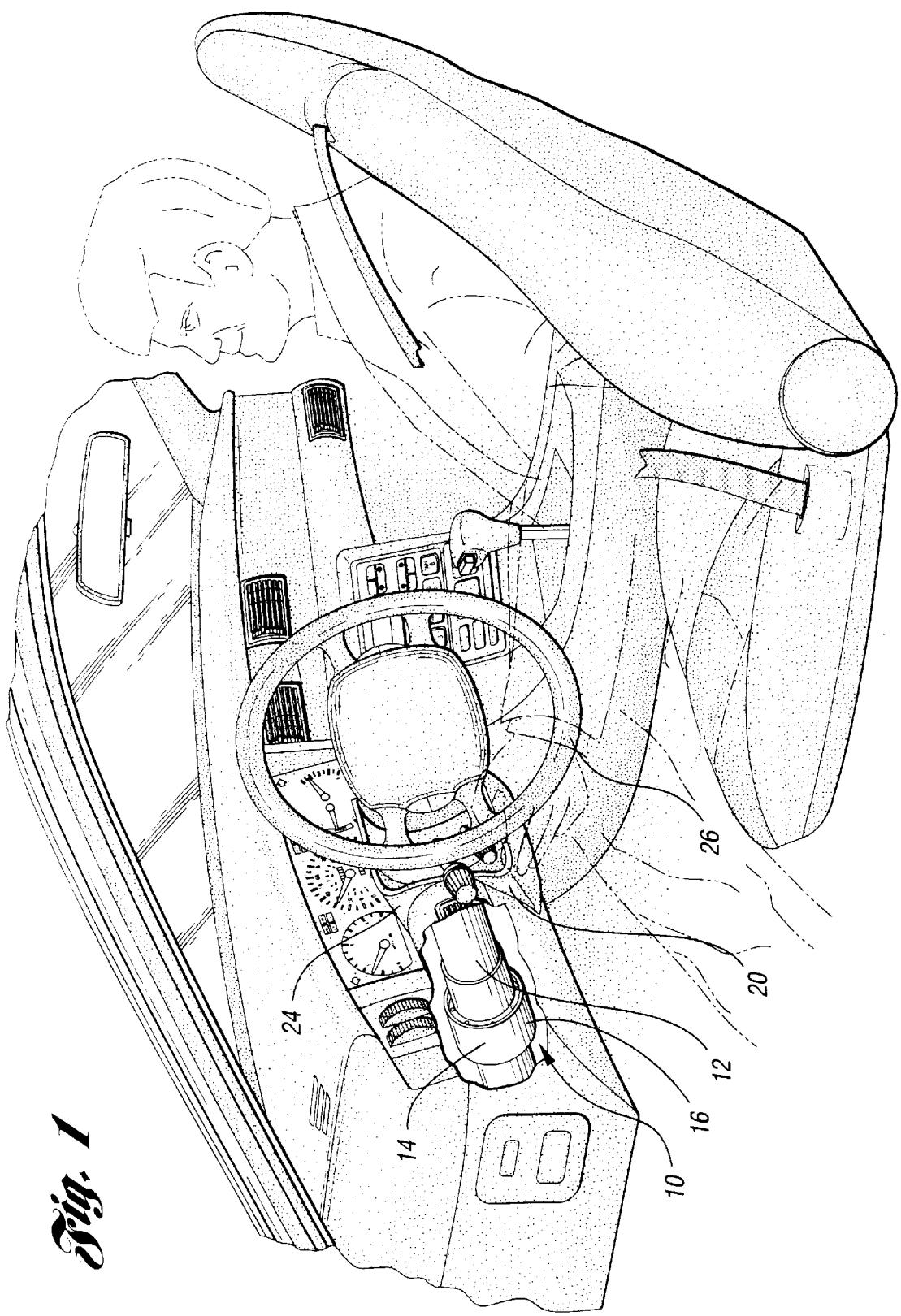

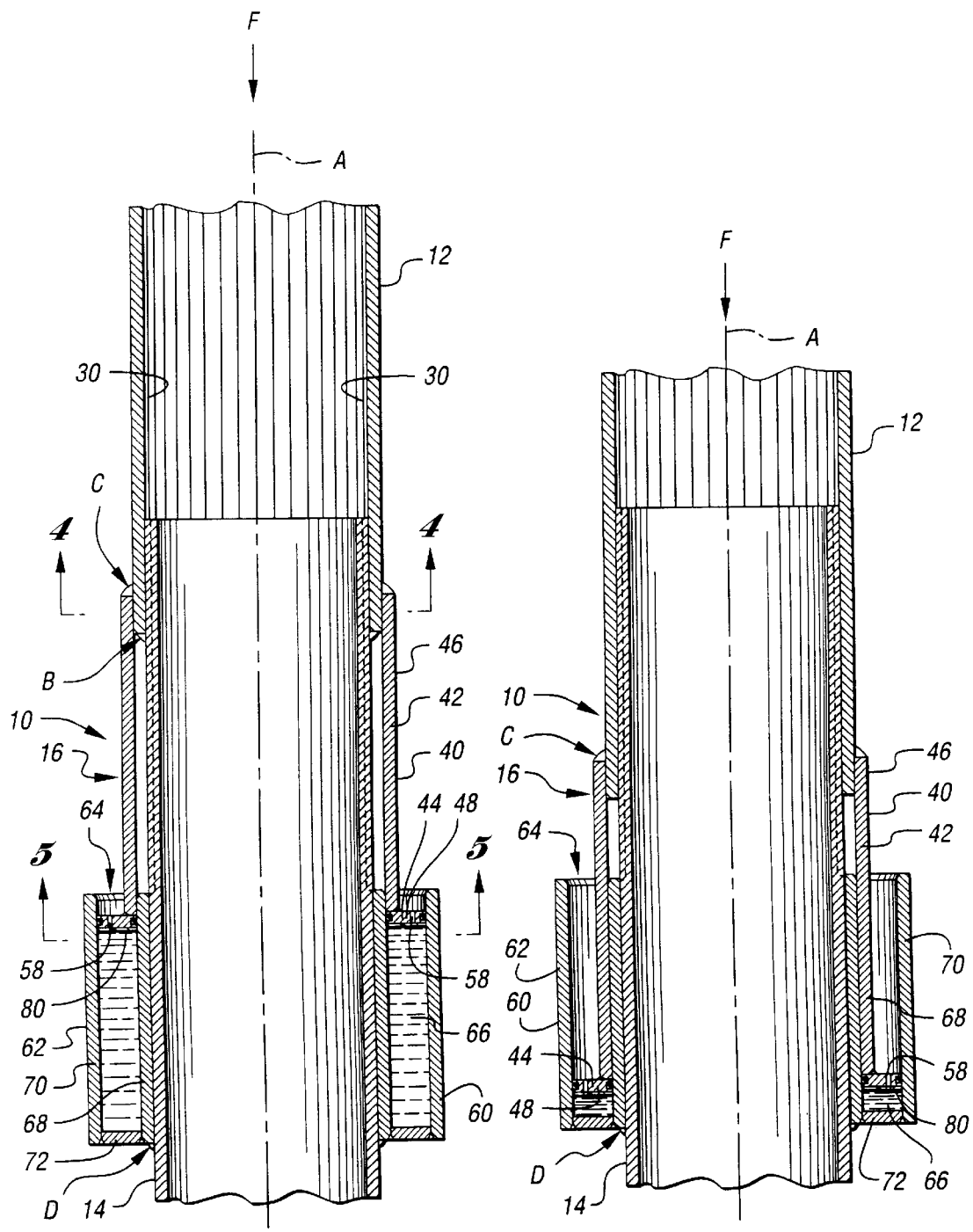

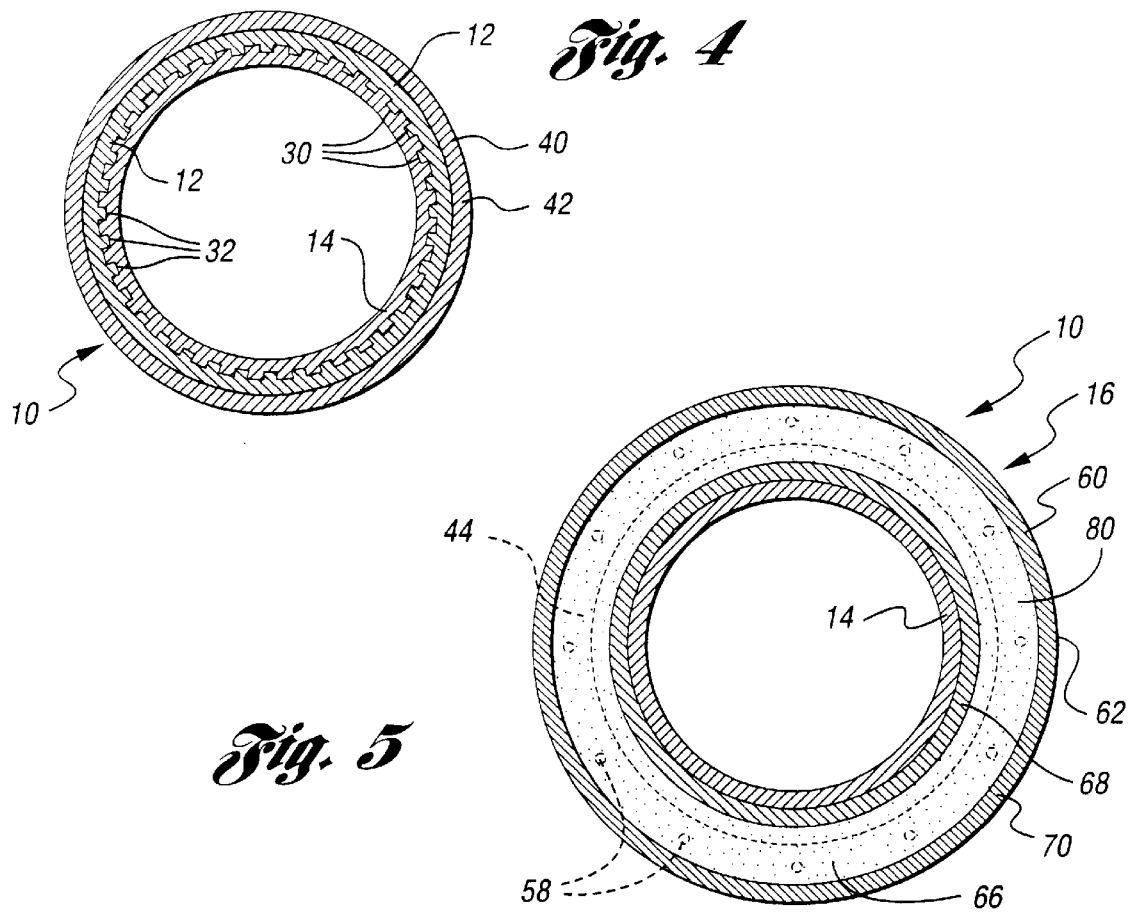
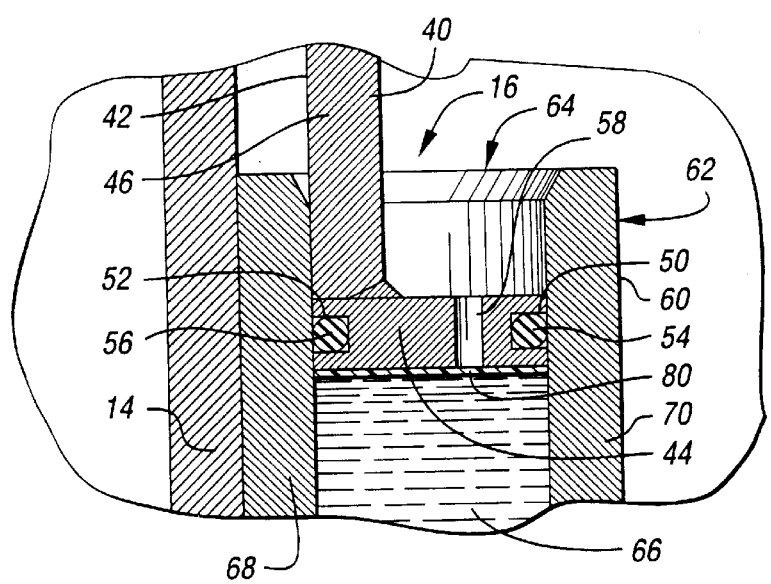

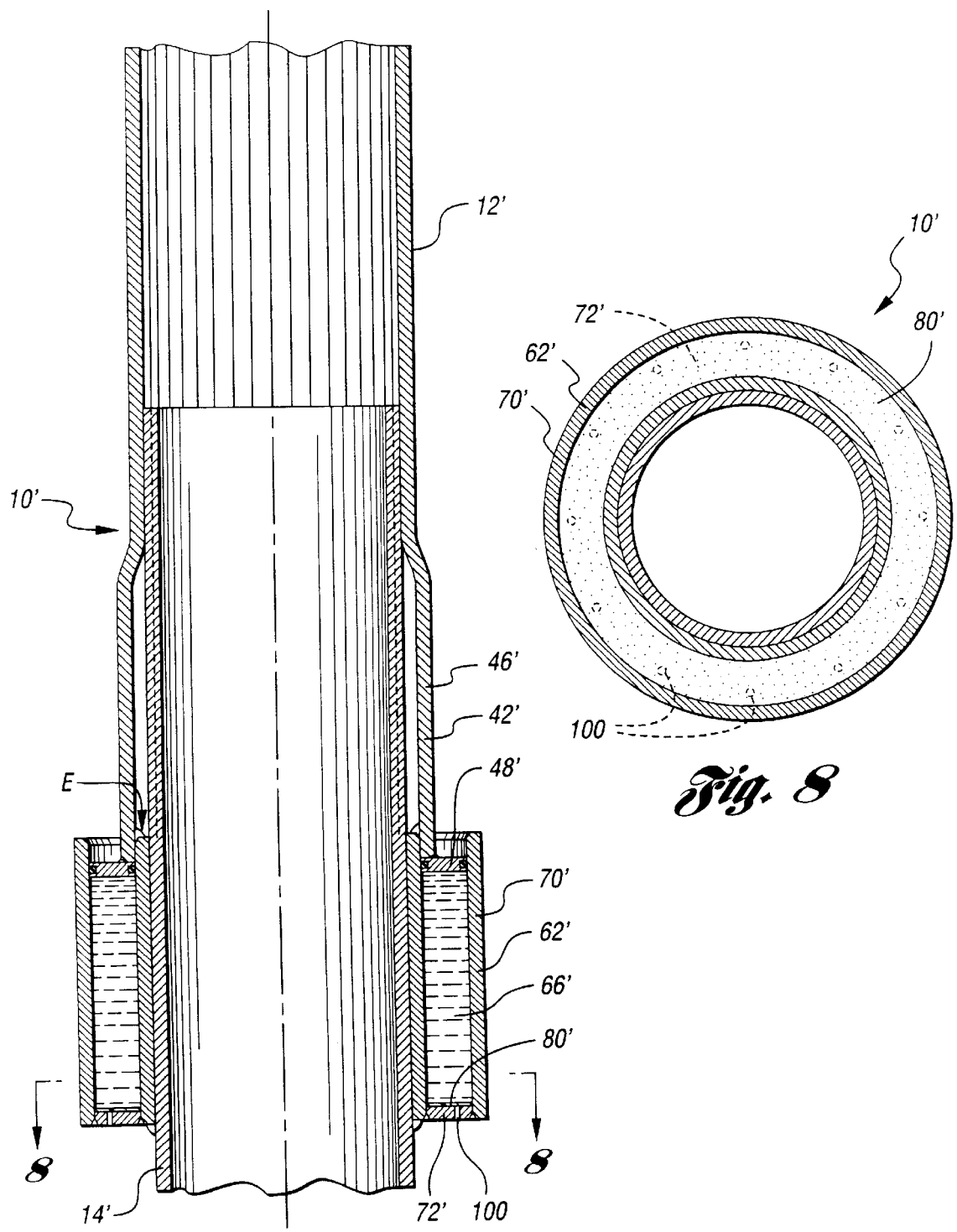

STEERING COLUMN ASSEMBLY

TECHNICAL FIELD

This invention relates to a steering column assembly, more particularly to a steering column assembly capable of absorbing impact energy.

BACKGROUND ART

The use of steering columns which are collapsible in order to absorb impact energy during collisions are well known.

Many such steering columns employ a deformable member to absorb energy upon impact and the ensuing collapse of the steering column. For example, U.S. Pat. No. 4,627,306, issued to Berenjian, discloses a collapsible steering column which includes telescopically engaged upper and lower column tubes and a steering shaft rotatably disposed within the upper and lower column tubes. The upper column tube is mounted to a steering column support member, such as being affixed to the dashboard assembly with a bracket assembly. The bracket assembly includes a means for absorbing impact loads through plastic deformation as the upper and lower column tubes move together axially during a collision.

Energy dissipating materials have also been used. For example, U.S. Pat. No. 4,643,448, issued to Loren, discloses an energy absorption steering assembly which includes an elongated tubular adapter sleeve mounted to the underside of an instrument panel. An elongated steering column is slidably retained co-axially within the adapter sleeve. The adapter sleeve includes an annular radial sleeve flange extending inward from the side walls of the adapter sleeve to slidably engage the steering column. The steering column includes an annular radial column flange extending outwardly from the side walls of the steering column so as to slidably fit within the adapter sleeve. The cavity between the adapter sleeve and the steering column, defined at the ends by the annular radial sleeve flange and the radial column flange, is filled with an elastically deformable plastic foam. Accordingly, when axial impact loads are imposed upon the steering column, the plastic foam is elastically deformed, thereby absorbing some or all of the energy of the impact as the steering column is displaced axially relative to the adapter sleeve.

SUMMARY OF THE INVENTION

An object of the present invention is to provide an improved steering column capable of absorbing impact energy.

In carrying out the above object, an improved steering column assembly is provided. The improved steering column assembly comprises an upper column member and a lower column member mounted to the upper column member such that the upper column member can move relative to the lower column member. A shock absorption assembly is interconnected between the upper column member and lower column member. The shock absorption assembly includes a piston member and a piston receiver, the piston receiver including absorbing material which, upon impact to the upper column member, is compressed by the piston member within the piston absorbing receiver and extruded from the piston absorbing receiver so as to absorb impact energy as the upper column member moves relative to the lower column member.

In a preferred embodiment, at least one of the piston member and piston receiver has an orifice through which the absorbing material is extruded.

In all of the embodiments described, the piston member may be connected to one of the upper and lower column member and the piston receiver may be connected to the other one of the upper and lower column member.

Furthermore, a breakable connection may be located between the upper column member and lower column member such that the upper column member may not move relative to the lower column member unless the breakable connection is broken.

Additionally, one of the upper and lower column member may have a spline and the other of the upper and lower column member may have a groove and the spline and groove may engage such that the upper column member may not rotate relative to the lower column member.

The piston absorbing receiver may also include an absorbing material container having an open end and containing the absorbing material and the piston member may have a piston shaft and a piston head portion which is movably received within the absorbing material container so as to compress the absorbing material when the upper column member moves relative to the lower column member.

In a preferred version of the embodiment last described, at least one of the piston head portion and absorbing material container has an orifice through which the absorbing material is extruded.

In all embodiments, the upper column member may be an upper sleeve and the lower column member may be a lower sleeve and one of the upper and lower sleeve may be telescopically received within the other one of the upper and lower sleeve. In such case, one of the upper and lower sleeve may have a spline and the other one of the upper and lower sleeve may have a groove and the spline and groove may engage such that the upper sleeve may not rotate relative to the lower sleeve.

Furthermore, the piston shaft may be a shaft cylinder and the piston head may be a head ring and the absorbing material container may have an inner cylinder wall, an outer cylinder wall, and a bottom ring wall running between the inner cylinder wall and the outer cylinder wall where the head ring is slidably received between the inner cylinder wall and the outer cylinder wall. In such case, it is preferred that at least one of the head ring and absorbing material container have an orifice through which the absorbing material is extruded.

The present invention also includes a steering column assembly comprising an upper column member adapted at one end to connect to a steering wheel and a lower column member adapted at one end for connection to a steering linkage assembly. The lower column member is connected to the upper column member for rotation therewith about a common longitudinal axis and the upper column member is axially movable relative to the lower column member. A shock absorbing assembly between the upper column member and lower column member includes a piston member connected to one of the upper and lower column member and a piston absorbing receiver connected to the other one of the upper and lower column member, the piston absorbing receiver including absorbing material which, upon impact to the upper column member, is compressed by the piston member within the piston receiver and extruded from the piston receiver so as to absorb impact energy as the upper column member moves axially relative to the lower column member. In this embodiment, it is also preferred that at least one of the piston member and piston receiver have an orifice through which the absorbing material is extruded.

The present invention additionally includes an improved steering column assembly for incorporation within a collapsible steering column. The improved steering column assembly comprises an upper column member and a lower column member, one of the upper column member and lower column member being concentrically located within and telescopically arranged relative to the other one of the upper column member and lower column member. A shock absorption assembly is connected to the upper column member and lower column member, the shock absorption assembly including a piston member and a piston absorbing receiver holding absorbing material, such that the absorbing material is compressed by the piston member within the piston absorbing receiver and extruded from the piston absorbing receiver when the upper column member is impacted so as to absorb impact energy as the upper column member telescopes relative to the lower column member. In this embodiment, similar to other embodiments, it is also preferred that at least one of the piston member and piston receiver have an orifice through which the absorbing material is extruded.

The steering column assembly of this invention provides a simple yet effective mechanism for absorbing impact energy imparted to a steering column. Unless the steering column assembly is impacted with an extremely high force as to cause damage to the assembly, an additional advantage of this invention during use is that it does not result in the deformation or crushing of the steering column assembly components. After use, repair of the steering column assembly is effected simply by moving the upper column relative to the lower column to its original position and refilling absorbing material within the piston receiver.

Further objects and advantages of this invention will be apparent from the following description, reference being had to the accompanying drawings wherein preferred embodiments of the present invention are clearly shown.

BRIEF DESCRIPTION OF THE DRAWINGS

While embodiments of the invention are illustrated, the particular embodiments shown should not be construed to limit the claims. It is anticipated that various changes and modifications may be made without departing from the scope of this invention.

FIG. 1 is an illustration showing the arrangement of the steering column assembly of this invention used in conjunction with a collapsible steering column;

FIG. 2 is a side view, in partial cross-section, of the energy absorbing steering column assembly of the present invention;

FIG. 3 is a side view, and partial cross-section, of the energy absorbing steering column assembly of the present invention in a collapsed position;

FIG. 4 is a cross-sectional view taken along line 4—4 of FIG. 2;

FIG. 5 is a cross-sectional view taken along line 5—5 of FIG. 2;

FIG. 6 is a magnified view of the piston-head portion of the piston member and the open end of the piston receiver shown in FIG. 2;

FIG. 7 is a side view, and partial cross-section, of an alternative embodiment of the energy absorbing steering column assembly of the present invention; and FIG. 8 is a cross-sectional view taken along line 8—8 of FIG. 7.

BEST MODE FOR CARRYING OUT THE INVENTION

One embodiment of the steering column assembly is shown generally at 10 in FIGS. 1 through 6. The steering column assembly 10 includes an upper column member, in this case an upper sleeve 12, a lower column member, in this case a lower sleeve 14, and an interconnecting shock absorption assembly 16.

As shown in FIG. 1, the steering column assembly 10 forms part of a collapsible steering column 20 which may be affixed to a steering column support member 22 (not shown). In the embodiment shown, the lower column member, in this case the lower sleeve 14, is affixed to the steering wheel support member 22 (not shown). The steering column support member may form part of the front dashboard assembly 24 of a vehicle. Since such connections between a steering column 20 and a steering column support member 22 are well known in the art, they will be not be discussed in further detail here.

In the embodiment shown, a steering wheel 26 is connected to a steering wheel shaft (not shown) at the upper end of the upper sleeve 12, while the steering wheel shaft (not shown) protrudes through the lower end of the lower sleeve 14 and is operatively connected to a steering linkage assembly 28 (not shown). Such connections within a steering column assembly 10 between the steering wheel 26, steering wheel shaft (not shown), and the steering linkage assembly 28 (not shown), are well known in the art and will not be discussed in further detail here.

The upper column member, in this case the upper sleeve 12, and lower column member, in this case the lower sleeve 14, are connected so as to be movable relative to each other. More specifically, and as best seen in FIGS. 2, 3 and 4 of this embodiment, the lower sleeve 14 in this embodiment has a smaller diameter, and is telescopically received within the upper sleeve 12. Both the upper sleeve 12 and the lower sleeve 14 have the same longitudinal axis A and the shock absorption assembly 16 is operatively connected to each. While not shown, in an alternative embodiment the upper sleeve 12 could have a smaller diameter so as to be telescopically received within the lower sleeve 14.

As shown in FIG. 2, the upper sleeve 12 may be connected to the lower sleeve 14 in a suitably breakable manner, such as by tack welding at the location B, so as to prevent the upper sleeve 12 and lower sleeve 14 from telescoping relative to each other along the longitudinal axis A until the steering wheel 26 is impacted with such force as to break the tack weld connection at location B and allow the upper sleeve 12 and lower sleeve 14 to telescopically move together relative to each other along longitudinal axis A.

Such tack welding at location B may also serve to prevent upper sleeve 12 from moving rotatably about lower sleeve 14 during normal use of the steering column 20. However, in order to prevent such rotation, and to allow the upper sleeve 12 and lower sleeve 14 to work together, it is preferable, as shown in FIGS. 2, 3 and 4, for the upper sleeve 12 to have splines 30 along the inner diameter which are slidably yet non-rotatably received within grooves 32 formed in the outer diameter of the lower sleeve 14. While not shown, the splines could alternatively be formed in the outer diameter of the lower sleeve 14 while the grooves could be formed in the inner diameter of the upper sleeve 12. Furthermore, any other suitable method or mechanism could be used to prevent the upper sleeve 12 from rotating relative to the lower sleeve 14 during normal use. For example, while not shown, the upper sleeve 12 and lower sleeve 14 could have non-circular mating cross-sections to prevent such rotation.

As best seen in FIGS. 2 through 6, the shock absorption assembly 16 of this embodiment includes a piston member 40 and a shock absorbing piston receiver 60.

While the piston member 40 could be connected to the lower sleeve 14 and the piston receiver 60 could be connected to the upper sleeve 12, in this embodiment the piston member 40 is shown as being connected to the upper sleeve 12, while the piston absorbing receiver 60 is connected to the lower sleeve 14. These connections may be made in any suitable manner, such as by welding at locations C and D as shown.

As shown in FIGS. 2–6, the piston member 40 of this embodiment includes a piston shaft 42 having a piston head portion 44. In this particular embodiment, the piston shaft 42 is a shaft cylinder 46 having an inside diameter approximately equal to the outside diameter of the upper sleeve 12 such that the upper sleeve 12 may reside within and be connected to the shaft cylinder 46. The connection between the upper sleeve 12 and the shaft cylinder 46 may be made in any suitable manner, such as by welding at location C.

The piston head portion 44 of this embodiment is a separate head ring 48 which may be suitably connected to the shaft cylinder 46. Any suitable method may be used for connecting the head ring 48 to the shaft cylinder 46, such as by welding.

In this embodiment, and as best shown in FIGS. 2, 3, and 6, the head ring 48 includes outer and inner sealing ring grooves, designated 50 and 52 respectively, which are formed along the outer and inner diameter of the head ring 48 respectively. Situated within the outer and inner sealing ring grooves, 50 and 52, are sealing rings 54 and 56, having a purpose which will be explained subsequently in further detail. The sealing rings 54 and 56 may be made from any suitable material.

As shown in FIGS. 2, 3, 5 and 6, the head ring 48 also has a number of head orifices 58 which communicate between each side of the head ring 48.

The piston receiver 60 in this embodiment includes an absorbing material container 62 having an open end 64 and containing absorbing material 66. The open end 64 of the absorbing material container 62 has inner dimensions approximately equal to the piston head portion 44 such that the piston head portion 44 is slidable within the absorbing material container 62.

In this embodiment, as shown in FIGS. 2, 3, 5, and 6, the absorbing material container 62 includes an inner cylinder wall 68, an outer cylinder wall 70, and a bottom ring wall 72. In this embodiment, the inner diameter of the inner cylinder wall 68 is approximately equal to the outer diameter of the lower inner sleeve 14. The inner cylinder wall 68 is connected to the outer cylinder wall 70 via the bottom ring wall 72 which may be connected to both the inner cylinder wall 68 and outer cylinder wall 70 in any suitable manner, such as by welding. As a result of this construction, the absorbing material container 62 is formed having only one open end 64.

In this embodiment, as shown in FIGS. 2, 5 and 6, the absorbing material container 62 is filled with absorbing material 66. The absorbing material 66 may comprise any suitable material, such as any suitable viscous fluid, which, upon compression of the piston head portion 44 within the piston absorbing receiver 60, will absorb a desired amount of shock or impact energy as the absorbing material 66 is extruded through the head orifices 58. It is believed that silicone fluid is a suitable absorbing material 66.

As shown in FIG. 2, the upper sleeve 12, lower sleeve 14, and shock absorption assembly 16, are assembled such that the piston head 44 is situated within the absorbing material container 62 such that a majority, if not all, of the remaining space within the absorbing material container 62 is filled with the absorbing material 66.

As shown in FIGS. 2 and 6, an orifice blocker 80 is used to prevent the absorbing material 66 from being extruded through the head orifices 58 prior to compression of the piston head 44 within the piston absorbing receiver 60 during impact loading. In the embodiment shown, the orifice blocker 80 constitutes a plastic film ring situated between the piston head portion 44 and the absorbing material 66. Any suitable plastic film could be used. It is also anticipated that many other orifice blockers 80 could be used, such as plugs made from wax or any other suitable material located within or covering the head orifices 58 themselves.

FIGS. 7 and 8 show an alternative steering column assembly 10' which differs in three ways from the steering column assembly shown generally at 10 in FIGS. 1–6. First, the upper sleeve 12' and the shaft cylinder 46' of the piston shaft 42' are formed from one stepped piece of material. Second, the piston head ring 48' does not have any head orifices. Instead, the bottom ring wall 72' of the absorbing material container 62' has a number of bottom orifices 100 which communicate between each side of the bottom ring 70'. While not shown, such orifices could also be located so as to communicate between each side of the outer cylinder wall 70' of the absorbing material container 62'. Third, in order to prevent the premature telescoping of upper sleeve 12 relative to lower sleeve 14, tack welding at location E has been utilized. Otherwise, the steering column assembly 10' shown in FIGS. 7 and 8 is identical to the steering column assembly 10 shown in FIGS. 2–6.

In operation, and upon a collision, the steering column assembly 10 may come into play if the driver or another occupant of the vehicle is impacted against the steering wheel 26 or steering wheel air bag of the steering wheel 26. If the impact is of sufficient force, the connection, if any, between the upper sleeve 12 and lower sleeve 14 will be broken, thereby allowing the upper sleeve 12 to telescopically move toward and relative to the lower sleeve 14. At the same time, this movement will cause the piston head 44 of the piston member 40 to be thrust into the piston absorbing receiver 60. The absorbing material 66 will then be compressed so as to break through the head orifice blockers 68 and be extruded through the head orifices 58 so as to absorb some of the impact energy imposed on the steering column.

As a result, the upper sleeve 12 will collapse in the direction designated F in FIGS. 2 and 3 along a longitudinal axis A relative to the lower sleeve 14 until the upper sleeve 12 comes to rest when all the impact energy has been absorbed. Thus, the steering column assembly 10 will end up in a collapsed position such as that shown in FIG. 3.

The sealing rings 54 and 56 act to prevent the absorbing material 66 from exiting the piston receiver 60 prior to impact. The sealing rings 54 and 56 also prevent or limit absorbing material 66 from being extruded out from the piston absorbing receiver 60 during impact except through the head orifices 58 such that the impact absorption characteristics of the steering column assembly 10 may be predictable.

In operation, the alternative steering column assembly 10' shown in FIGS. 7 and 8 works in a very similar way except that during an impact the absorbing material 66' would be compressed so as to break through the orifice blockers 68' and be extruded through the ring orifices 58' so as to absorb impact energy imposed on the steering column.

In all of these embodiments, the upper sleeve, lower sleeve, piston member, and piston receiver may be made from any suitable material such as any suitable grade of steel.

While particular embodiments of this invention have been illustrated and described, it will be obvious to those skilled in the art that various changes and modifications may be made without departing from this invention. It is intended that the following claims cover all such modifications and all equivalents that fall within the true spirit and scope of this invention.

What is claimed is:

1. A steering column assembly comprising:

an upper column member, a lower column member mounted to the upper column member such that the upper column member can move relative to the lower column member, a shock absorption assembly interconnected between the upper column member and lower column member, the shock absorption assembly including a piston member and a piston receiver, the piston member having a piston head portion which is slidably and sealing received within the piston receiver, the piston receiver including absorbing material which, upon impact to the upper column member, is compressed by the piston head portion of the piston member within the piston receiver and extruded from the piston receiver so as to absorb impact energy as the upper column member moves relative to the lower column member.

2. The steering column assembly as defined in claim 1 wherein at least one of the piston member and piston receiver has an orifice through which the absorbing material is extruded.

3. The steering column assembly as defined in claim 1 wherein the piston member is connected to one of the upper and lower column member and the piston receiver is connected to the other one of the upper and lower column member.

4. The steering column assembly as defined in claim 1 wherein a breakable connection is located between the upper column member and the lower column member such that the upper column member may not move relative to the lower column member unless the breakable connection is broken.

5. The steering column assembly as defined in claim 1 wherein one of the upper and lower column member has a spline and the other of the upper and lower column member has a groove and the spline and groove engage such that the upper column member may not rotate relative to the lower column member.

6. The steering column assembly as defined in claim 1 wherein the piston receiver includes an absorbing material container having an open end and containing the absorbing material and the piston head portion is slidably and sealingly received within the absorbing material container so as to compress the absorbing material when the upper column member moves relative to the lower column member.

7. The steering column assembly as defined in claim 6 wherein at least one of the piston head portion and absorbing material container has an orifice through which the absorbing material is extruded.

8. The steering column assembly as defined in claim 1 wherein the upper column member is an upper sleeve and the lower column member is a lower sleeve and one of the upper and lower sleeve is telescopically received within the other one of the upper and lower sleeve.

9. The steering column assembly as defined in claim 8 wherein one of the upper and lower sleeve has a spline and the other one of the upper and lower sleeve has a groove and the spline and groove engage such that the upper sleeve may not rotate relative to the lower sleeve.

10. The steering column assembly as defined in claim 8 wherein the piston receiver includes an absorbing material container having an open end and containing the absorbing material and the piston head portion is slidably and sealingly received within the absorbing material container so as to compress the absorbing material when the upper sleeve telescopes relative to the lower sleeve.

11. A steering column assembly comprising:

an upper column member adapted at one end to carry a steering wheel, a lower column member adapted at one end for connection to a steering linkage assembly and connected to the upper column member for rotation therewith about a common longitudinal axis, the shock absorption assembly including a piston member and a piston receiver, the upper column member being axially movable relative to the lower column member, a shock absorbing assembly between the upper column member and lower column member, the shock absorption assembly including a piston member and a piston receiver, the piston member having a piston head portion which is slidably and sealing received within the piston receiver, the piston receiver including absorbing material which, upon impact to the upper column member, is compressed by the piston head portion of the piston member within the piston receiver and extruded from the piston receiver so as to absorb impact energy as the upper column member moves axially relative to the lower column member.

12. The steering column assembly as defined in claim 11 wherein the piston member is connected to one of the upper and lower column member and the piston receiver is connected to one of the other one of the upper and lower column member.

13. The steering column assembly as defined in claim 11 wherein the piston receiver includes an absorbing material container having an open end and containing the absorbing material and the piston head portion is slidably and sealingly received within the absorbing material container so as to compress the absorbing material when the upper column member moves axially relative to the lower column member.

14. The steering column assembly as defined in claim 13 wherein at least one of the piston head portion and absorbing material container has an orifice through which the absorbing material is extruded.

15. The steering column assembly is defined in claim 11 wherein at least one of the piston member and piston receiver has an orifice through which absorbing material is extruded.

16. A steering column assembly comprising:

an upper column sleeve, a lower column sleeve telescopically connected to the upper column sleeve for rotation with the upper column sleeve and such that the upper column sleeve can axially move relative to the lower column sleeve, a shock absorption assembly interconnected between the upper sleeve and lower sleeve, the shock absorption assembly including a piston member connected to one of the upper and lower sleeve and a piston receiver connected to the other one of the upper and lower sleeve, the piston member having a piston head portion which is slidably and sealingly received within the piston receiver, at least one of the piston member and piston receiver having an orifice, the piston receiver including absorbing material which, upon impact to the upper sleeve, is compressed by the piston head portion of the piston member within the piston receiver and extruded through the orifice so as to absorb impact energy as the upper sleeve telescopes and moves axially relative to the lower sleeve.

17. The steering column assembly as defined in claim 16 wherein a breakable connection is located between the upper column sleeve and lower column sleeve such that the upper column sleeve may not move axially relative to the lower column sleeve unless the breakable connection is broken.

18. A steering column assembly for incorporation within a collapsible steering column, the steering column assembly comprising:

an upper column member and a lower column member, one of the upper column member and lower column member being concentrically located within and telescopically arranged relative to the other one of the upper column member and lower column member, a shock absorption assembly connected to the upper column member and lower column member, the shock absorption assembly including a piston member and a piston receiver holding absorbing material, the piston member having a piston head portion which is slidably and sealingly received within the piston receiver such that the absorbing material is compressed by the piston head portion of the piston member within the piston receiver and extruded from the piston receiver when the upper column member is impacted so as to absorb impact energy as the upper column member telescopes relative to the lower column member.

19. The steering column assembly as defined in claim 18 wherein at least one of the piston member and piston receiver has an orifice through which the absorbing material is extruded.

20. A steering column assembly comprising:

an upper column number having an upper sleeve, a lower column number having a lower sleeve, one of the upper and lower sleeve being telescopically received within the other one of the upper and lower sleeve, a shock-absorption assembly interconnected between the upper column member and the lower column member, the shock absorption assembly including a piston member having a piston shaft and a piston head ring and a piston receiver having an absorbing material container, the absorbing material container having an inner cylinder wall, and outer cylinder wall, and a bottom ring wall running between the inner cylinder wall and the outer cylinder wall such that the head ring is slidably received within the inner cylinder wall and the outer cylinder wall, the absorbing material container including absorbing material which, upon impact to the upper column member, is compressed by the ring member within the absorbing material container and extruded from the absorbing material container to absorb impact energy as the upper column member telescopes relative to the lower column member.

21. The steering column assembly as defined in claim 20 wherein at least one of the head ring and absorbing material container has an orifice through which the absorbing material is extruded.

* * * * *